Patented Jan. 7, 1936

2,027,337

UNITED STATES PATENT OFFICE 2,027,337

MANUFACTURE OF RESINS

Adolf Heck, Kansas City, Mo., assignor to Cook Paint & Varnish Company, Kansas City, Mo., a corporation of Delaware No Drawing. Application March 30, 1931, Serial No. 526,568

11 Claims. (Cl. 260—4)

This invention relates to the manufacture of resins; and it comprises an improvement in the art of producing heat hardening resins from phenols, wherein a phenol is initially condensed with phthalic anhydrid in the presence of certain catalysts and the phenol-phthalic anhydrid condensation products are reacted with an aldehyde and the aldehyde reaction product partially resinified with the aid of heat until a resinous product soluble in alcohols, esters and ketones is obtained, the resinous products being sometimes esterified with glycerine or other polyhydric alcohols, and it further comprises the products of such process; all as more fully hereinafter set forth and as claimed.

In some of the heat hardening resins the fundamental structural unit is a cyclic carbon compound united to an aliphatic group, both the ring and the chain carrying hydroxyls (.OH). On heating bodies of this structure condensation and polymerization take place with formation and elimination of H₂O; molecules uniting to form complex groups. The action is progressive and the longer it continues the less is the fusibility and the solubility of the heated material in the ordinary solvents. In making phenol-formaldehyde condensation products the primary action of the formaldehyde is the production of phenol alcohols or bodies containing a phenolic .OH and a methyl alcohol residue or carbinol group —CH₂OH. Afterwards, these condense with each other as stated. It is usual to employ cresols in lieu of phenol itself; one reason being that the primary structural unit, or phenol alcohol, is somewhat more complex. In making resins by partially esterifying phthalic anhydrid with glycerin and subsequently heating, the phthalic anhydrid furnishes the ring group and the glycerin the aliphatic group.

I have found that in both ways of making resins, improved results are obtained by preliminarily condensing the phenol with phthalic anhydrid. In so doing complex bodies are obtained which contain phthalic residues combined with phenol residues in various ways and these bodies when reacted with formaldehyde or esterified with glycerin give still more complex structural units for condensation and polymerization, passing over into resins more smoothly and giving better resins. Not so much heating is required to produce a given degree of infusibility and insolubility from initially fusible and soluble resinified products. The solubilities and fusibilities of the initial products are better.

In the present invention I first condense phthalic anhydrid with phenols under the influence of aluminum chlorid. Ferric chlorid and zinc chlorid may also be used but are not better. The product of the reaction is an indefinite material; its constitution probably varying in detail with the details of operation. For my purposes however the exact chemical nature of the condensation product is not material. Phenol itself or any of its homologues such as cresols, xylenols, etc., may be used. Each specific phenol makes a specifically different product; but all the products are useful for the present purposes. Ordinarily I employ two phenol molecules for each phthalic anhydrid molecule. While I have indicated the use of anhydrids, I may use the corresponding organic polycarboxylic acids. The initial condensation products in my process contain, in addition to the carbocyclic nucleus, both hydroxyl and carboxyl groups. The reaction product so far formed, whatever its nature, is not complex enough to give a good heat hardening resin. I therefore treat the reaction product in various ways to form more complex bodies resinifiable to valuable resins, usually after rough purification to get rid of the catalyst. These secondary treatments are of the two general types indicated ante or are modifications of these general classes.

A particular embodiment of the present invention in preparing an initial condensation product of a phenol with phthalic anhydrid is as follows:

*Example 1*

Approximately two molecules of ordinary phenol are reacted with approximately 1 molecule of phthalic anhydrid in the presence of freshly sublimed aluminum chlorid as a catalyst. In so doing, 190 parts of phenol are heated to a temperature of 80 to 90° C. and then 148 parts of phthalic anhydrid mixed with the heated phenol. After a homogeneous solution is obtained, 10 to 50 parts of aluminum chlorid are slowly added. A violent reaction occurs and the temperature rises to about 120 to 130° C. After completion of this initial violent reaction, the reaction mixture is held at 120° until a gelatinous mass is obtained; approximately two hours being required for the formation of the gelatinous mass.

The product thus obtained is an initial condensation product which by subsequent secondary treatments can be converted into valuable resins. The product may be used in its crude state or it may be more or less purified and refined in any suitable manner. The crude reaction product is quite acid in nature and contains residues of the catalyst. When it is desired to have a secondary condensation effected by means of an acid catalyst, the crude product may be directly used. If it is desired to have the secondary reaction occur in the presence of an alkaline catalyst, the acidity of the raw reaction product may be removed by washing or by other purification or it may be merely neutralized with any suitable base.

The reaction product is of rather indefinite constitution, but it probably contains para-dioxytriphenylcarbinol-o-carboxylic acid, or the lacetone of that compound which is phenolphthalein where ordinary phenol ($C_6H_5.OH$) is the phenol used; or both the acid and the lactone. However, the exact nature of the complex reaction products is not here material, it being sufficient that they are useful for the present purposes; that they may by suitable treatment hereinafter set forth be converted into certain new and valuable resins.

In the above example phenol (carbolic acid) may be replaced by similar phenolic bodies such as cresols or xylenols. Also the phthalic anhydrid may be replaced with phthalic acid or by another suitable polybasic acid of the cyclic series.

The material produced with the aid of aluminum chlorid from a phenol and phthalic anhydrid contains carboxyl groups and phenolic hydroxyl. It may be treated in several ways within the purview of this invention to make useful resins. In one such way of treatment the residual carboxyl groups are simply esterified with glycerin, glycol or the like. This gives a complex molecule and good resins. In addition to, or in lieu of, esterifying the carboxyl groups, the phenolic groups may be esterified with various fatty acids. Reaction products after esterification in either or both ways, on heating give resinous bodies of decreasing solubility and progressively higher melting point; the decrease and the increase being something like those occurring with other heat hardening resins.

In another method of operation producing valuable resins, the initial condensation product is further condensed with formaldehyde, being thereby carbinolated. By "carbinolated" I mean the introduction into the phenol-phthalic anhydrid condensation product of a —$CH_2OH$ group, herein termed a "carbinol" group. This condensation or reaction with formaldehyde is illustrative of the addition of a simple aliphatic chain containing a hydroxyl group, to the aromatic nuclei of the initial condensation product.

Example 2

100 parts of an initial reaction product obtainable as set forth in Example 1, are reacted at a temperature of about 130° C. with 5 to 25 parts of commercial solid formaldehyde ("paraform") or with 25 to 75 parts of aqueous formaldehyde of the usual 30-35 commercial aqueous solution. A violent reaction takes place, and after it has subsided, the reaction mixture may be further heated at about 170° C., to insure complete reaction. There are obtained light yellow, clear elastic resins as primary reaction products. These are completely soluble in alcohols, esters and ketones. Many are also soluble in hydrocarbons such as benzol and oil of turpentine. In cases where the resins so produced are not completely soluble in hydrocarbon solvents, an addition of a small amount of alcohol gives a homogeneous solution.

They are useful in making spirit varnishes, enamels and lacquers. Further when heated to the proper temperatures, they are fusible and may be heat-hardened; and may therefore be advantageously used in making molding compositions from which molded articles may be produced by means of heat and pressure. They are somewhat acid in character and this is advantageous in certain molding compositions. Further resinification tends to reduce their acid character.

However, for some uses, it is desired that the resin be less acid or be substantially neutral. In such cases, the initial resins may be esterified with a polyhydric alcohol, such as glycerin, to reduce their acidity. For instance, about 5 per cent of glycerin may be added to the reaction mixture just prior to the final heating at 170° C. Or the acid resin may be subsequently esterified with glycerin by heating an admixture to the required temperature; the degree of esterification being so controlled to give the desired acidity or a neutral condition as may be desired. Some of the esterified resins produced under the present invention have an acid number of about 30. These modified esters are pale-colored resins; the solubilities being about the same as those of the initial resins. They are useful in making spirit varnishes, enamels and lacquers. They are also fusible and heat-hardening, and may be used in making molded articles under the influence of heat and pressure. The heat hardened derivatives are hard, infusible and insoluble bodies.

Another way of making condensation products also uses formaldehyde in the presence of a catalyst. A typical example is:

Example 3

100 parts of a reaction product formed by the process of Example 1, using cresol in place of phenol, are heated to a temperature of about 100° C. 5 to 20 parts of hexamethylenetetramin are gradually added. The ammonia of the hexamethylenetetramin catalyzes the reaction of the formaldehyde. In place of the hexamethylenetetramin there may be used 80 to 340 parts of formaldehyde and 1 to 5 parts of ammonia in aqueous solution. In either event a vigorous reaction occurs and there is formed a light, yellow elastic resin. It is soluble in alcohols, esters and ketones; and is almost completely soluble in hydrocarbons, such as benzol. A slight addition of alcohol to solutions in benzol and like hydrocarbons assists in forming a clear homogeneous solution. Resins of this type may be used in making spirit varnishes, enamels and lacquers. Further, when heated to proper temperatures they are fusible and may be heat-hardened. They may be formed into molded articles by means of heat and pressure. They have an acid number between 30 and 40.

While they are not so acid in character as the initial resins produced in Example 2, they may be sufficiently acid to be esterified with polyhydric alcohols, such as glycerin, in a manner similar to that given in Example 2. Such esterified products are pale-colored, neutral, hard resins. They are soluble in alcohols, ketones and esters and in most cases in hydrocarbon solvents, such as benzol and the like. With benzol and like solvents, a small amount of alcohol facilitates obtaining clear solutions. They may be used in making spirit varnishes, enamels and lacquers.

The esterified products are also fusible and capable of heat-hardening. They, like the unesterified resins from which they are derived, are advantageous materials to use in compounding molding compositions from which articles may be made by hot molding which are insoluble, infusible bodies. In making molding compositions from either the esterified or unesterified resins, I find that it is sometimes advantageous to add a small amount of hexamethylenetetramin to the resin. Such addition facilitates the conversion of the resins into insoluble and infusible bodies in hot molding.

In disclosing certain applications of my new resins, I refer to spirit varnishes, oil varnishes, enamels and lacquers. I use such terms in a broad and generic sense. By spirit varnishes I mean generally solutions of the resins in volatile solvents irrespective whether this solvent is ethyl alcohol or a like solvent; the final varnish film being formed mainly by evaporation of a solvent. An oil varnish is a varnish which gives a film by drying, polymerization or other complex reaction, rather than by a direct evaporation of a solvent. These oil varnishes may be made by melting or blending the resins with a drying oil or similar vehicle. Of course, blending agents and co-solvents which are volatile may be used; but the formation of the film is primarily due to other causes than the evaporation of the co-solvent or blending agent. I likewise use the term enamel in a broad sense, meaning either a spirit or oil varnish which has been pigmented, that is, such varnishes containing pigments, extenders and the like. In the scope of the term lacquer I include compositions in which a resin is blended with cellulose derivatives; the blended, film-forming ingredients being dissolved or dispersed in the vehicle. These lacquers may also include the so-called plasticizers such as dibutyl phthalate, tricresyl phosphate, diethyl phthalate, and like materials. With these lacquers the film is primarily formed by evaporation of the solvent or vehicle. My new resins are different from the materials heretofore used in making such varnishes, enamels and lacquers and the properties of these new resins are somewhat different in certain respects from the materials heretofore used. While the primary formation of the film may be similar to that with the prior art, the new resins give a somewhat superior coating or film. The new resins due to their quite different properties may undergo some reaction or condensation or polymerization which modifies the formation of the film and accounts for the superior excellence of these coatings. Many of my resins are capable of being heat-hardened to give infusible, insoluble resinous bodies and are useful as binders. The coatings produced with the varnishes, enamels and lacquers derived from my new resins may be heat-hardened to further improve the film coat.

The above examples illustrate typical embodiments of my generic process. The amounts of materials used, the materials themselves, the temperatures and other conditions under which both the initial and secondary condensations are effected may be varied within wide limits to produce specific resins having the desired characteristics for a particular application. In making the initial condensation phenol may be replaced with cresols, xylenols and similar phenolic bodies and the phthalic anhydrid may be replaced with phthalic acid or other suitable polybasic acid of the cyclic series. The initial reaction products formed from any of these materials may be subjected to a secondary condensation. In the secondary condensation which involves adding a carbinol group, that is a hydroxylated side chain by reacting with an aldehyde, any suitable aldehyde such as formaldehyde, acetaldehyde, acrolein, furfural and polymers of such aldehydes or compounds yielding the aldehyde such as hexamethylenetetramin, may be used. In the secondary condensations involving the addition of a hydroxylated side chain by esterification of acid groups, glycerin, glycol or like polyhydric alcohols may be used. Free fatty acids or resin acids may also be used for esterification of hydroxyl groups. Abietic acid and "monkopalin" acid etc., are typical resin acids. The fatty acids of linseed oil, wood oil, perilla oil, soy bean oil, castor oil, etc. are advantageous. The fatty oils themselves may be used as they contain both a fatty acid and glycerin. When the fatty oils are used directly there seems to be an interaction or reaction between the oil and the initial condensation products of the type produced in Example 1. It is advantageous however to use the glycerin and the fatty acid as individual reactants as better control is possible in such cases.

The esterification of the initial reaction products is itself a distinct type of secondary condensation within the scope of my invention, but such esterification may also be used as a further modification of secondary condensation products made by reaction with formaldehyde and the like.

What I claim is:

1. As an improvement in the manufacture of useful complex resins from phenols and aldehydes, the improvement which comprises condensing about 2 mols of a phenol with 1 mol of an anhydrid of an aromatic dicarboxylic acid in the presence of an inorganic catalyst of the class consisting of chlorides of aluminum, iron and zinc, reacting 100 parts of the condensation product thus obtained with between 5 and 25 parts of an aldehyde said parts being parts by weight and partially resinifying the aldehyde reaction product by heating said reaction product to about 170° C. until a resinous product soluble in alcohols, esters and ketones is obtained.

2. The process of claim 1 wherein said anhydrid is phthalic anhydrid.

3. The process of claim 1 wherein said aldehyde is formaldehyde.

4. As an improvement in the manufacture of useful complex resins from phenols and aldehydes, the process which comprises adding an aromatic dicarboxylic acid anhydrid to a molten phenol in a molecular ratio of approximately 1:2 of anhydrid to phenol, adding aluminum chloride to the homogeneous solution thus obtained, permitting the first violent reaction to subside and then heating the reaction mixture until the reaction is substantially complete and a gelatinous mass is obtained, adding an aldehyde to the gelatinous mass thus obtained, permitting the first reaction to subside and then heating the aldehyde reaction mixture until a partially resinified complex resin soluble in alcohol, esters and ketones is obtained.

5. The process of claim 4 wherein a polyhydric aliphatic alcohol is added to the aldehyde reaction product prior to said partial resinification by heating thereby producing upon said partial resinification an esterified resin having a reduced acid number and improved solubility.

6. As an improvement in the manufacture of useful complex resins from phenols and aldehydes, the steps which comprise heating approximately 190 parts of phenol between 80 and 90° C., adding about 148 parts of phthalic anhydrid to the heated phenol, continuing the heating until a homogeneous solution is obtained, slowly adding between 10 to 50 parts of aluminum chloride to the said solution, permitting the first violent reaction to subside and then heating the reaction mixture to about 120° C. until the reaction is substantially complete and recovering the condensation product thus obtained, mixing about 100 parts of said condensation product with 5 to 25 parts of actual formaldehyde, heating the mixture to about 130° C. until the initial vigorous reaction subsides and then continuing the heating at about 170° C. until a partially resinified product soluble in alcohols, esters and ketones is obtained, said product being a light yellow clear elastic resin.

7. As new and improved intermediate resins, the light colored, elastic complex resins obtainable by the process of claim 1, said complex resins being partially resinified aldehyde reaction products of a phenol-phthalic anhydrid condensation product, being soluble in alcohols, esters and ketones, and being capable of conversion into insoluble and infusible bodies by further heating.

8. The process of claim 1 wherein the reaction with aldehyde is effected in the presence of an alkaline catalyst.

9. The process of claim 1 wherein the said condensation product obtained by condensing a phenol with anhydrid of an aromatic carboxylic acid is reacted with hexamethylene tetramine, to form said aldehyde reaction product, said reaction being automatically effected under alkaline conditions.

10. The process of claim 1 wherein said partially resinified product soluble in said solvents is subsequently subjected to heat and pressure to form shaped, insoluble, infusible articles.

11. The process of claim 6 wherein said partially resinified product soluble in said solvents is subsequently subjected to heat and pressure to form shaped, insoluble, infusible articles.

ADOLF HECK.